United States Patent
Ogiwara et al.

(10) Patent No.: US 7,599,101 B2
(45) Date of Patent: Oct. 6, 2009

(54) IMAGE PROCESSING APPARATUS AND IMAGE PROCESSING METHOD

(75) Inventors: Hideaki Ogiwara, Tochigi (JP); Katsunori Aoyagi, Tochigi (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 10/992,792

(22) Filed: Nov. 22, 2004

(65) Prior Publication Data

US 2005/0140991 A1     Jun. 30, 2005

(30) Foreign Application Priority Data

Dec. 24, 2003   (JP)   ............................ P2003-426698

(51) Int. Cl.
*H04N 1/387*   (2006.01)
(52) U.S. Cl. ................... 358/450; 358/1.2; 358/1.18; 358/400; 358/448
(58) Field of Classification Search ................ 358/1.2, 358/1.18, 450, 1.1, 3.26–3.27, 400, 448, 358/1.15
See application file for complete search history.

(56) References Cited

U.S. PATENT DOCUMENTS

| | | | |
|---|---|---|---|
| 5,357,348 A * | 10/1994 | Moro | ..................... 358/450 |
| 5,995,712 A | 11/1999 | Doi | |
| 6,480,294 B1 | 11/2002 | Toyoda et al. | |
| 6,667,814 B1 * | 12/2003 | Tillotson | ................... 358/1.15 |
| 2002/0051205 A1 | 5/2002 | Teranishi et al. | |
| 2002/0054372 A1 | 5/2002 | Takahashi | |
| 2003/0107784 A1 | 6/2003 | Togashi | |
| 2003/0202211 A1 * | 10/2003 | Yudasaka et al. | ............ 358/1.18 |
| 2004/0190062 A1 * | 9/2004 | McIntyre | ................... 358/1.18 |

FOREIGN PATENT DOCUMENTS

EP           0577924           1/1994

(Continued)

OTHER PUBLICATIONS

English language Abstract of JP 1-106576.

(Continued)

*Primary Examiner*—King Y Poon
*Assistant Examiner*—Iriana Cruz
(74) *Attorney, Agent, or Firm*—Greenblum & Bernstein P.L.C.

(57) ABSTRACT

An image processing apparatus has an image combining function in which a plurality of pages of image data is scanned, the plurality of pages of the scanned image data is combined into one page, and the combined image data is printed on a single sheet of recording paper. The image processing apparatus comprises a scanner which scans the plurality of pages of the image data. Each of the plurality of pages of the image data has a size different from each other. The image processing apparatus also has a printer which prints image data on a sheet of the recording paper. Further, the image processing apparatus comprises a controller which determines the image data having a largest size among the plurality of pages of the scanned image data. The controller determines a size of a sheet of the recording paper, based on the determined largest size. Further, the controller combines the plurality of pages of the scanned image data into one page, and prints the combined image data on the single sheet of the recording paper having the determined size.

5 Claims, 11 Drawing Sheets

FOREIGN PATENT DOCUMENTS

| | | |
|---|---|---|
| JP | 61-265969 | 11/1986 |
| JP | 1-106576 | 4/1989 |
| JP | 4-294679 | 10/1992 |
| JP | 10-307460 | 11/1998 |
| JP | 10307460 | * 11/1998 |

OTHER PUBLICATIONS

English language Abstract of JP 61-265969.
English language Abstract of JP 4-294679.
English language Abstract of JP 10-307460.

* cited by examiner

IMAGE PROCESSING APPARATUS AND IMAGE PROCESSING METHOD

FIELD OF THE INVENTION

The present invention relates to an image processing apparatus and an image processing method which scan various types of documents.

DESCRIPTION OF RELATED ART

When a small document, like a postcard or a business card, is copied by a photocopier, it is convenient to scan a plurality of such a type of documents and to print them on a single sheet of recording paper, in order to keep them or to view them. On the other hand, a type of a photocopier has a combining function in which a plurality of documents are scanned, are combined into one page of image data, and are printed on a single sheet of recording paper (see Prior Art Document 1).

Furthermore, when a thick document, such as a book, is scanned, a platen cover of the photocopier can not be closed completely. Thus, when this type of the document is scanned, a black border are printed around image data corresponding to the scanned document on a sheet of recording paper, but this printed data is unsightly. Thus, another type of a photocopier has an erasing function in which the black border is erased when the scanned is printed (see Prior Art Document 2).

[Prior Art Document 1]
Japanese Kokai (Laid Open) Patent H4-294679

[Prior Art Document 2]
Japanese Kokai (Laid Open) Patent H10-307460

However, before the document is scanned, an operator has to specify a size of output image data or a conversion rate of the output image data, by considering a size of the document, in order to obtain the output image data with a proper size. When a plurality of documents are combined in to one page, the plurality of documents may includes various sizes of documents or may have so many pages. In this case, it is very hard for the operator to specify the size of the output image data or the conversion rate of the output image data. It is also difficult for the operator to obtain the satisfactory output image data.

The photocopier also has a manual key to erase the black border surrounding the image data within a scanning area of the photocopier. The manual key switches the photocopier into the erasing process. If the operator forgets to select the manual key for the erasing process, the output image data with the black border is printed, and the operator must scan the document again to obtain the output image data without the black border. Thus, the photocopier is required, the photocopier being able to perform the erasing process without selecting the manual key.

SUMMARY OF THE INVENTION

The present invention relates to an image processing apparatus has an image combining function in which a plurality of pages of image data is scanned, the plurality of pages of the scanned image data is combined into one page, and the combined image data is printed on a single sheet of recording paper. The image processing apparatus comprises a scanner which scans the plurality of pages of the image data. Each of the plurality of pages of the image data has a size different from each other. The image processing apparatus also has a printer which prints image data on a sheet of the recording paper. Further, the image processing apparatus comprises a controller which determines the image data having a largest size among the plurality of pages of the scanned image data. The controller determines a size of a sheet of the recording paper, based on the determined largest size. Further, the controller combines the plurality of pages of the scanned image data into one page, and prints the combined image data on the single sheet of the recording paper having the determined size.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The following will describe an embodiment of the invention with reference to the attached drawings.

Figure 1:
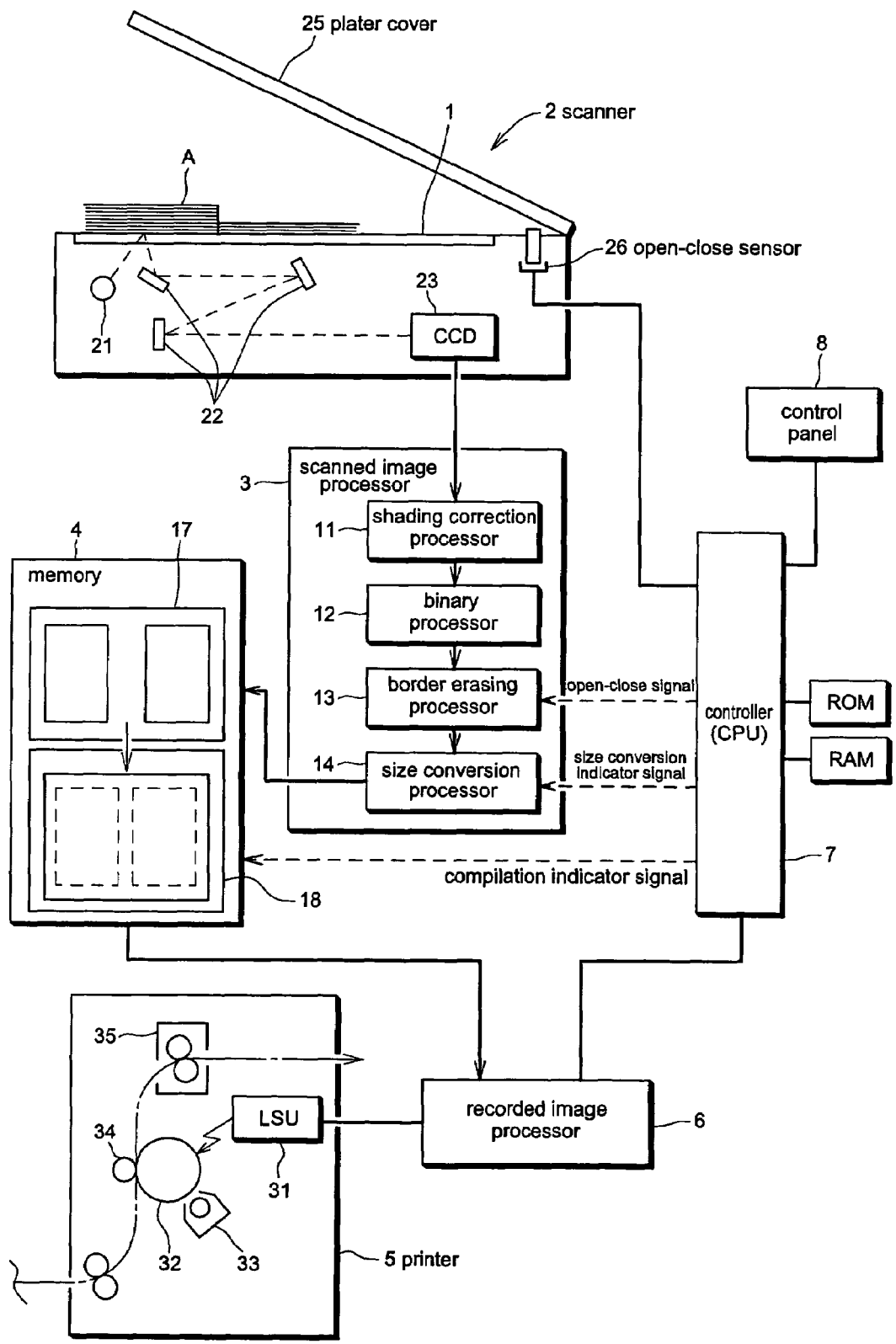
FIG. 1 is an block diagram of the basic structure of the image processing apparatus.

FIG. 1 is a block diagram illustrating the structure of the image processing apparatus of the present invention. The image processing apparatus includes scanner 2 that scans original document 'A.' The original document 'A.' is placed on document platen 1 (a glass surface). The image processing apparatus comprises scanned image processor 3 which applies a predetermined process to the image data obtained from scanner 2. The image processing apparatus has page memory 4 which stores the image data obtained from scanned image processor 3. The image processing apparatus includes printer 5 which generates image data to be printed on recording paper based on the image stored in page memory 4. The image processing apparatus comprises printer 6 which appropriately processes the image data generated by printer 5. The image processing apparatus has controller 7 which controls the aforesaid operations, and control panel 8 which indicates the control functions for the aforesaid operations.

Scanned image processor 3 incorporates shading correction processor 11 that corrects for misalignment between image pixels. Scanned image processor 3 also incorporates binary processor 12 that converts multi-valued data to binary data using an error diffusion or like method. Scanned image processor 3 further incorporates border erasing processor 13 which erases image data within the scanned image external to the scanned document. Scanned image processor 3 incorporates size conversion processor 14 that executes an image size conversion process by thinning or interpolating the image data, according to a predetermined size conversion rate.

Memory 4 is equipped with image storage 17 which stores a plurality of pages of the image data obtained from scanned image processor 3 in single page format, and with image compiler 18 which combines the aforesaid plurality of pages of the image data into a single page of the image data.

Scanner 2 executes the scanning operation by illuminating the original document with lamp 21, and directing the light reflected from the original document, through mirrors 22, to CCD 23. CCD 23 feeds the image signal to scanned image processor 3. Scanner 2 includes platen cover (document holding device) 25 and open-close sensor (open-close detection device) 26 that monitors the raised (open) or lowered (closed) position of platen cover 25. Open-close sensor 26 outputs sends, to controller 7, a signal indicating whether platen cover 25 is open or close. Controller 7 sends a open-close signal to border erasing processor 13 of scanned image processor 3, based on the signal output form open-close sensor 26. Border erasing processor 13 performs a border erasing process. The border erasing process erases a black border arising outside the scanned image data and within a scanning area of scanner 2.

Control panel 8 incorporates various types of control keys, including a "start key" that initiates the document scanning operation. The control keys are used to set the operating modes for the image size conversion process executed by scanned image processor 3 and for the image combining process executed by page memory 4. When the mode, that executes the image size conversion process, is set, a size conversion indicator signal is sent from controller 7 to size conversion processor 14 of scanned image processor 3, and then the size conversion processing operation is performed. Also, when the mode, that activates the image combining process, is set, a compilation indicator signal is sent from controller 7 to image compiler 18 of page memory 4, and then the image combining process is performed.

Moreover, control panel 8 allows an operator to specify the size of the single output image, into which the plurality of pages of the image data are combined by image compiler 18.

In printer 5, LSU (laser scanning unit) 31 emits a laser scanning beam, based on the image data supplied by recording image processor 6. The laser beam emitted by LSU 5 irradiates light-sensitive drum 32 to form a latent image which becomes visible by the application of toner from developer unit 33. The toner image on light sensitive drum 32 is then transferred to the recording paper by roller 34. The toner image is thermally stabilized on the recording paper by fixing unit 35. The finished copy is then ejected from printer 5.

Figure 2:
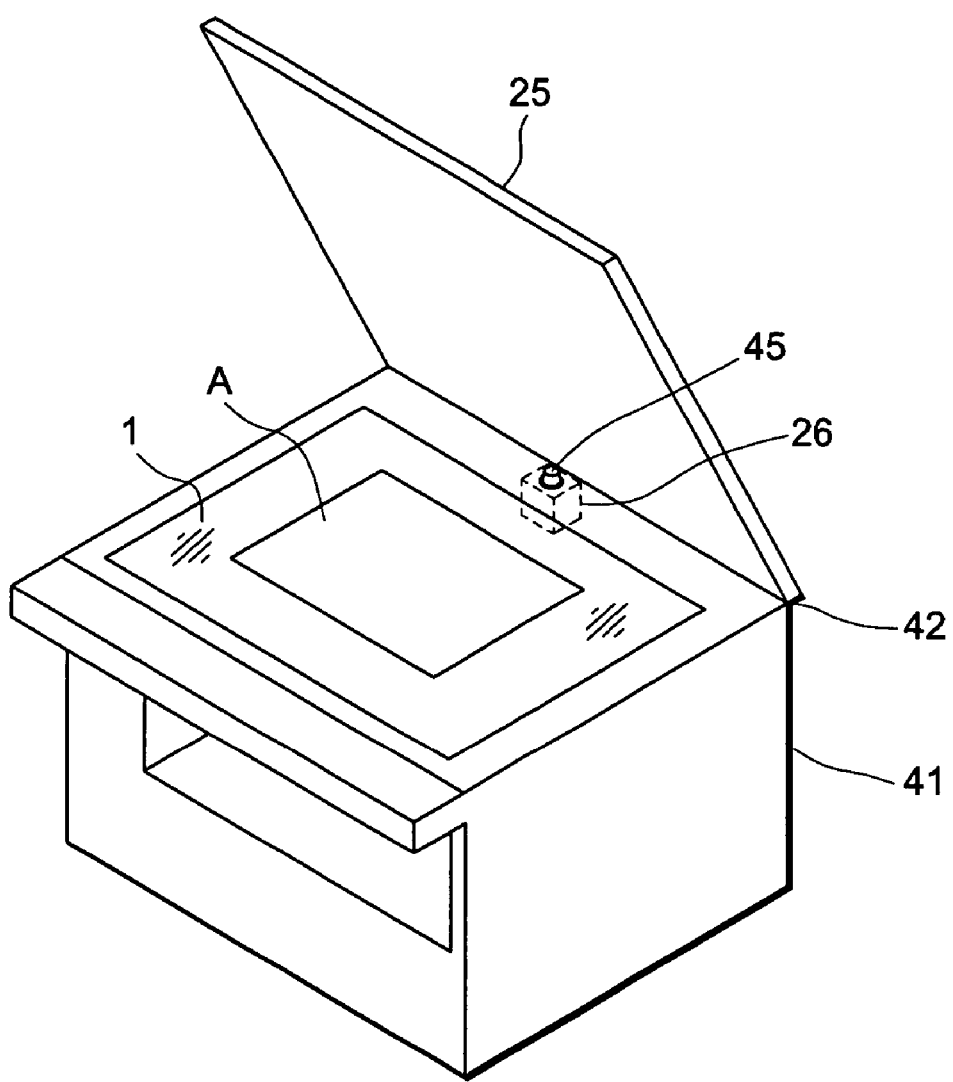
FIG. 2 is a perspective view illustrating the position of the open-close sensor shown in FIG. 1.

FIG. 2 is a perspective view showing the location of the open-close sensor 26 illustrated in FIG. 1. Platen cover 25 is pivotably attached to case 41 through hinge 42 which is mounted to the upper surface of case 41. Original document platen 1 is located on the upper surface of case 41, and open-close sensor 26 is located adjacent to hinge 42. Open-close sensor 26 is an optical proximity sensor that detects reflected light or shade through the operation of detection member (feeler) 45. Detection member 45, which is movably installed to the upper surface of case 41 so as to allow its downward movement therein, is able to detect the closed position of platen cover 25 by being pushed downward by patent cover 25 when it closes against case 41.

Figure 3:
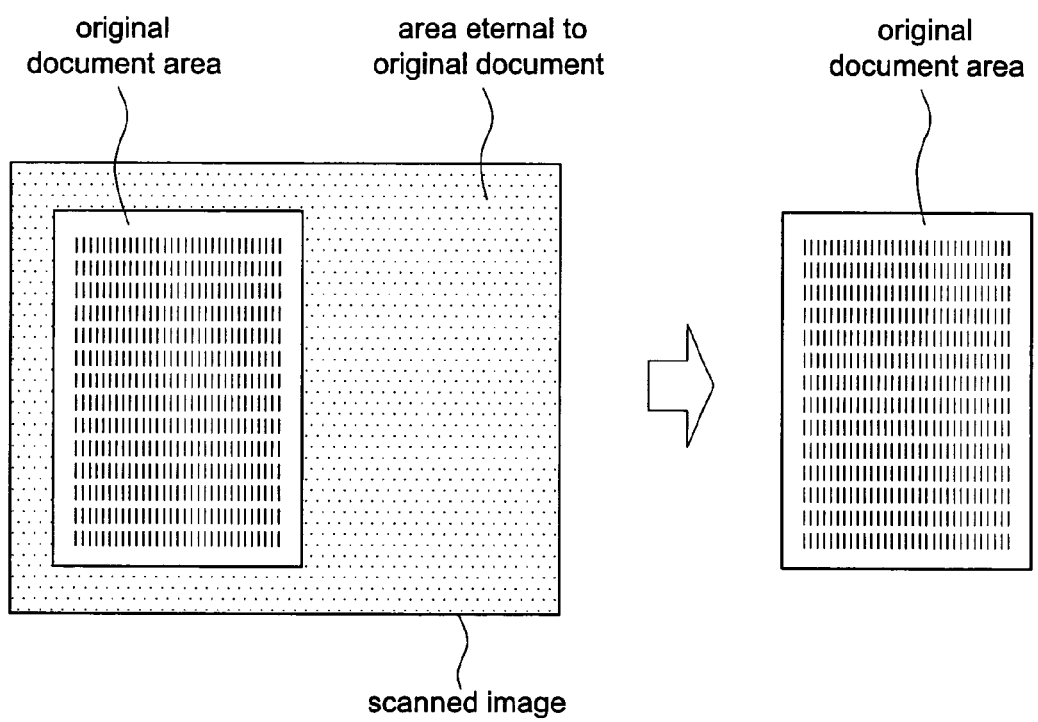
FIG. 3 illustrates the border erasing process conducted by the scanned image processor shown in FIG. 1.

FIG. 3 illustrates the border erasing process conducted by the scanned image processor 3 shown in FIG. 1. When the scanning process is performed with platen cover 25 open, a continuous area of black pixels appears in the area external to the scanned image data and in the area surrounding the scanned image data. The border erasing process is applied to this area which is external to the scanned image data. In border erasing process, pixel data, which is generated from each single line of the scanned image data, is stored in a line memory. When the pixel data is read out from the line memory, the continuous black pixel area extending from the scan start point is detected. After that, next continuous black pixel area is reset each time when a continuous white pixels area is detected, after detection of the continuous black pixel area from the scan start point. When the last remaining area of continuous black pixels is detected. Thereby, the continuous black pixel areas of both sides of the scanned image data are detected and erased, and the effective image data without the black border can be obtained.

Moreover, the border erasing process can be performed by another way. For example, the original document is scanned twice. In the first scan, the border area (area external to the original document) is detected. In the second scan, the image data is obtained. The border area can be erased form the scanned image data of the second scan, based on the detection of the first scan. Thereby, only image data, corresponding to the internal area of the original document, can be obtained without the black border.

Figure 4A:
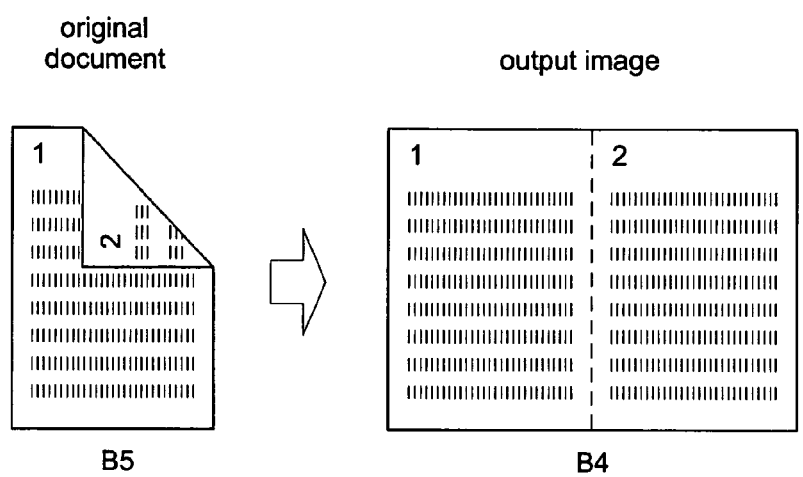
FIG. 4(A) illustrates one example of the relationship between the original document(s) and output image as processed by the image processing apparatus shown in FIG. 1.

FIGS. 4(A) and (B) provide examples of the original document and output image formed by the image processing apparatus shown in FIG. 1. When the image output size is not specified by the operator from control panel 8, the size of the output image is determined, based on the size of the image obtained from scanned image processor 3 and the number of images. After that, the image combining process is performed by image compiler 18 based on the determined output size. Because an image output size has not been specified in this example, the image size conversion process is not executed. Therefore, the image output size is determined, based on unconverted sizes of the image data, which have been obtained from border erasing processor 13, so as to arrange a plurality of pages of the image data with the unconverted sizes on the recording paper.

When the image output size is determined, the largest size of the scanned image data is judged, based on the plurality of pages of the image data obtained from scanned image processor 3. The largest size is assigned to each of the plurality of pages of the image data. The image output size is obtained by multiply the largest size by the number of pages of the image data. Therefore, the same size image area is assigned to each original document image regardless of the size of the scanned image data.

FIG. 4(A) illustrates one example of the output image which is generated by utilizing a "2 into 1" function. The "2 into 1" function is a function in which two pages the scanned image data are printed on a single sheet of the recording paper. This example shows the output image in which the scanned front and back sides of a single page document are arranged as a side-by-side output image. In this case, the image output size is two times the size of the original document because the two images of the front and back sides of the document are the same size. For example, when the original document is B5 size, the output size becomes B4 which is twice the size of B5.

Figure 4B:
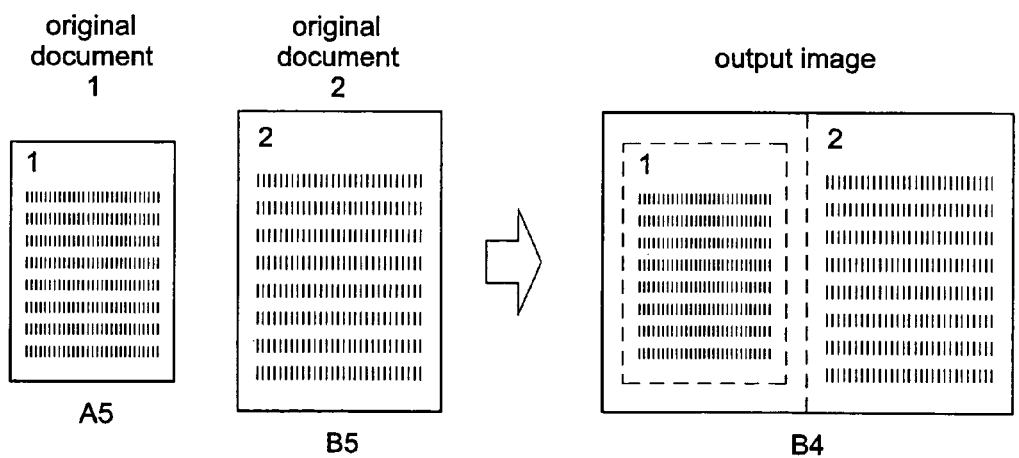
FIG. 4(B) illustrates the other example of the relationship between the original document(s) and output image as processed by the image processing apparatus shown in FIG. 1.

FIG. 4(B) illustrates another example of the output image which is generated by utilizing the "2 into 1" function. This example shows the output image in which one side of two different size documents are arranged as a side-by-side output image. In this case, the size, which is assigned to each page of the arranged image data, is determined, based on the second (larger) original document. In this embodiment, the size, which is assigned to each page of the arranged image data, is named an image size unit. In this case, the second original document is a B5 size document, and thus the image output size becomes B4 which is twice the size of the B5. The B5 is the image size unit. The scanned image data of the first (smaller) A5 size original document, which is smaller than the image size unit, is placed in the center of the area corresponding to the image size unit, thus a amount of white space arises around the scanned image data of the first (smaller) A5 size original document.

Figure 5:
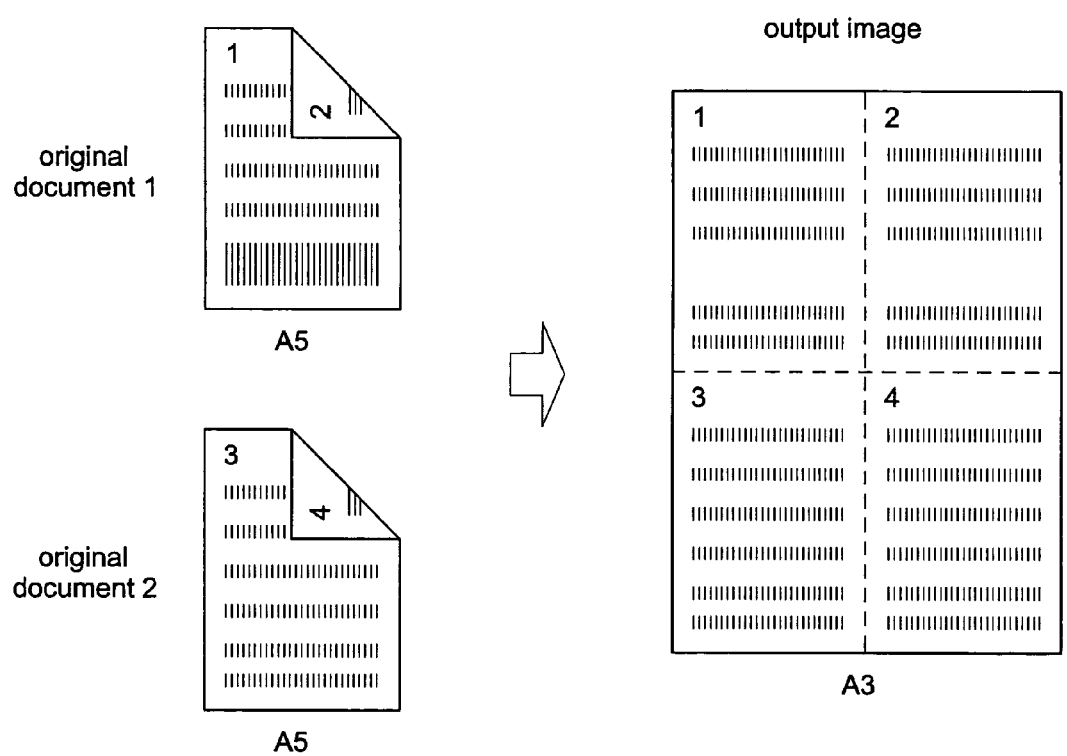
FIG. 5 illustrates an example of the relationship between the original document and output image as processed by the image processing apparatus shown in FIG. 1.

FIG. 5 illustrates an example of the original document and output image relating to the image processing apparatus shown in FIG. 1. In this case, the front and back sides of two original documents are scanned, and the four images are placed in horizontal and vertical alignment to form an "N into 1" output image (in which N=4). The "N into 1" output image means that N pages of the scanned image data are combined into one page image data, and the combined on page image data is printed on a single sheet of the recording paper. Because both of the original documents are size A5, the output size becomes A3 which is four times the size of A5.

FIG. 6 (A)-(D) illustrates examples of the original document and output image relating to the image processing apparatus shown in FIG. 1. When the output size is specified and the size conversion mode activated through control panel 8, scanned image processor 3 applies the size conversion process to appropriately size the images to the output size. Image compiler 18 then combines the reduced or enlarged images into a single output image.

In regard to the size conversion process, the image size unit is calculated, based on the specified output size and on each of the number of images set at control panel 8. The size conversion rate is determined by comparing the image size unit with the actual image size. After that, scanned image processor 3 executes the size conversion process, according to the size conversion rate. The size conversion rate is determined for each of the scanned image data so as to establish the optimum size image for the image size unit. Furthermore, the image size unit is determined, by dividing the specified output size by the number of images set via control panel 8. An equal-size is assigned to each of the original document images, on the output image.

Figure 6A:
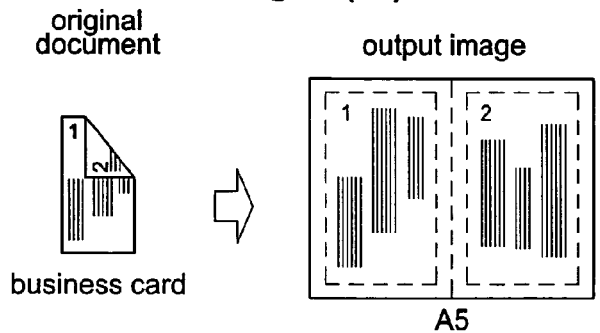
FIG. 6(A) illustrates a first example of the relationship between the original document and output image as processed by the image processing apparatus shown in FIG. 1.
Figure 6B:
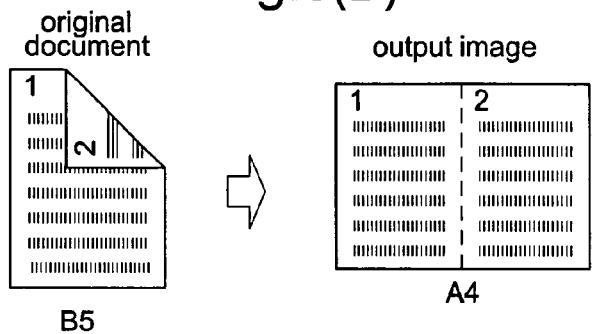
FIG. 6(B) illustrates a second example of the relationship between the original document and output image as processed by the image processing apparatus shown in FIG. 1.

FIGS. 6(A) and 6(B) illustrate "2 into 1" output images in which the scanned front and back sides of a single page document are arranged as a side-by-side output image. In FIG. 6(A), the specified output size is A5, and because there are two images, the image size unit becomes A6 which is one half of A5. Because the original document is the size of a business card, the size conversion process enlarges the image by 144%. Thus, an output image, in which the enlarged images of the front and back sides of the original document have been arranged, is obtained.

In FIG. 6(B), the specified output size is A4, and because there are two images, the image size unit becomes size A5 which is one half of size A4. Because the original document is B5 size, the size conversion process reduces the image by 81%. Thus, an output image, in which the reduced images of the front and back sides of the original document have been arranged, is obtained.

Figure 6C:
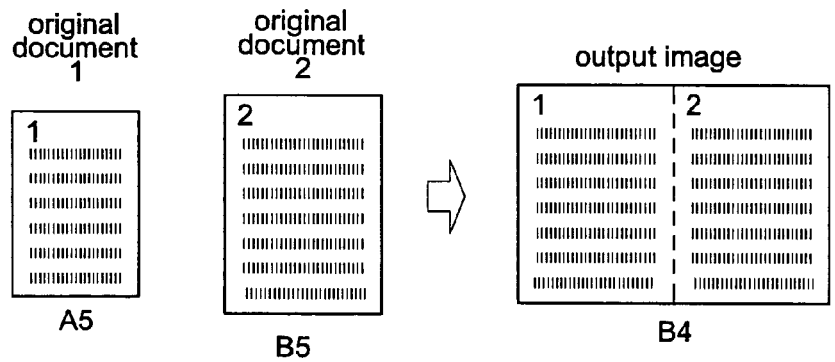
FIG. 6(C) illustrates a third example of the relationship between the original document and output image as processed by the image processing apparatus shown in FIG. 1.
Figure 6D:
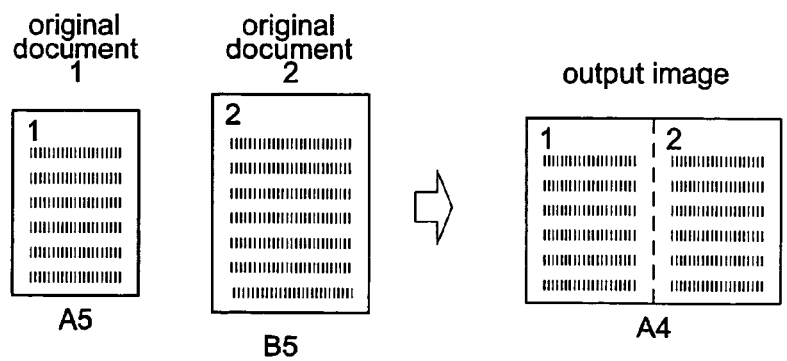
FIG. 6(D) illustrates a fourth example of the relationship between the original document and output image as processed by the image processing apparatus shown in FIG. 1.

FIGS. 6(C) and 6(D) show "2 into 1" output images in which two images are scanned from one side of two different size single-page original documents, and the two scanned images are arranged as a side-by-side output image. In FIG. 6(C), the image size unit is size B5, and a half size of the specified image size which is B4. The size conversion operation enlarges the A5 size image of the original document, which is smaller than the image size unit B5, by applying a size conversion rate of 122%. Because the B5 image size of the second original document is the same size as the image size unit, the image is used as actual size.

In FIG. 6(D), the image size unit is size A5, and a half size of the specified output size of A4. The B5 image size of the second original document, a size which is larger than the image size unit A5, is reduced by the size conversion operation applying an 81% size conversion rate. The A5 image size of the first original document, which is the same size as the image size unit, is used as actual size.

Figure 7A:
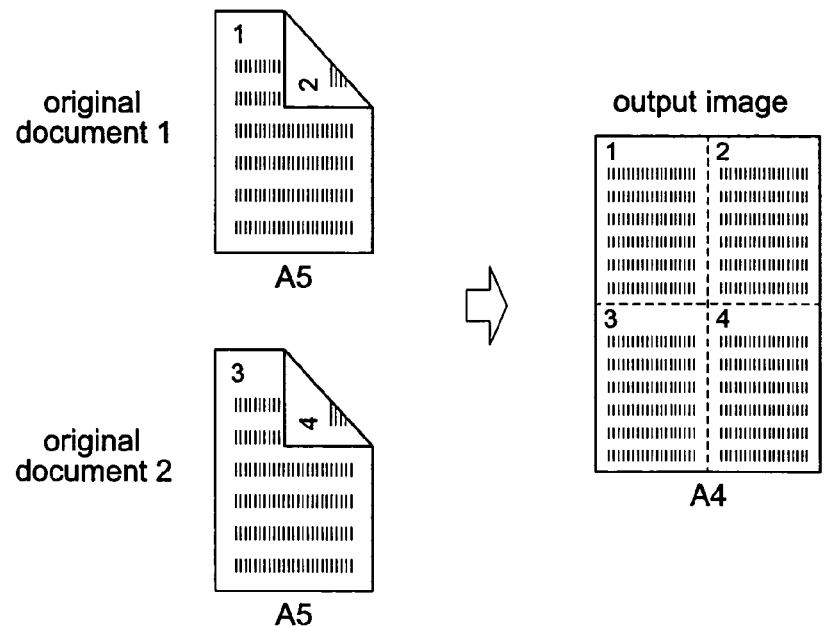
FIG. 7(A) illustrates one example of the relationship between the original documents and output image as processed by the image processing apparatus shown in FIG. 1.

FIG. 7(A) and (B) illustrate examples of the original document and output image relating to the image processing apparatus shown in FIG. 1. In this example, the front and rear sides of two original single-page documents are scanned, and the scanned images are aligned vertically and horizontally on a single sheet of the recording paper to obtain an "N into 1" image (N=4). In FIG. 7(A), the image size unit is size A6 which is one fourth the A4 size specified as the output image size. The A5 size of the original document, which is larger than the image size unit A6, is reduced by the size conversion process applying a 70% size conversion rate.

Figure 7B:
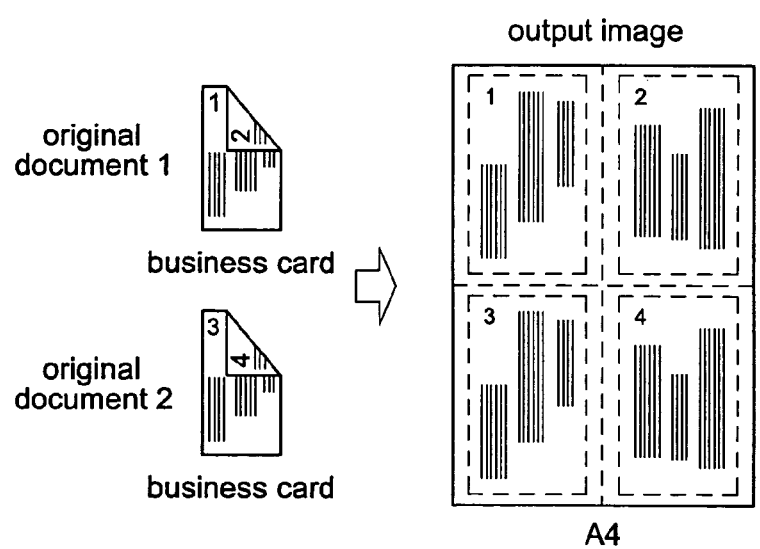
FIG. 7(B) illustrates the other example of the relationship between the original documents and output image as processed by the image processing apparatus shown in FIG. 1.

In FIG. 7(B), as in the previous example, the image size unit is A6, a size one fourth that of the specified A4 output size. The size conversion process applies a 144% size conversion rate to enlarge the image of the postcard-sized original document image which is smaller than the image size unit.

Furthermore, even though the size conversion mode has been activated, when the image sizes of all the original documents are the same as the image size unit, which has been determined by the number of images and the output size, a 100% size conversion is applied. In other words, the images will be arranged in their actual size.

Additionally, the output image will be generated as an arrangement of actual size images if the output size has been specified without activation of the size conversion mode. In this case, as in the previous example, the image arrangement is based on the image size unit which is derived from the output image size and the number of images. At this time, an output image will be obtained, as shown in the FIG. 4 and FIG. 5 examples, if the output image size is specified, based on the original document size and the number of images.

Figure 8:
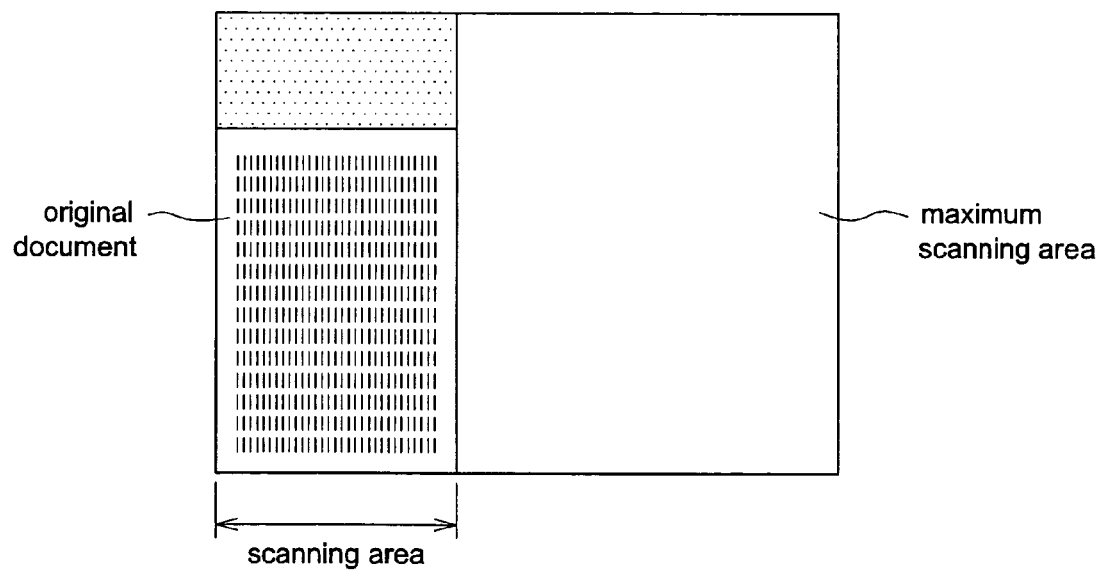
FIG. 8 illustrates the original document scanning process as it relates to the image processing apparatus shown in FIG. 1.

FIG. 8 illustrates the scanning operation relating to the image processing apparatus shown in FIG. 1. When the output size is specified without applying the size conversion process, scanner 2 will scan an original document within a predetermined scanning area, based on the image size unit which is derived from the output size and number of images set at control panel 8.

When the output size has been specified without applying the size conversion process, an output image is generated on which actual size images are arranged, but the image area, allocated for each original document image, will be limited to the image size unit derived from the specified output size and number of images. Regardless of the actual size of the original document, a scanning area, within the maximum scanning area but beyond the border of the image area, is not scanned because the scanned area is limited to the size image size unit. Therefore, the scanning time is reduced.

Figure 9:
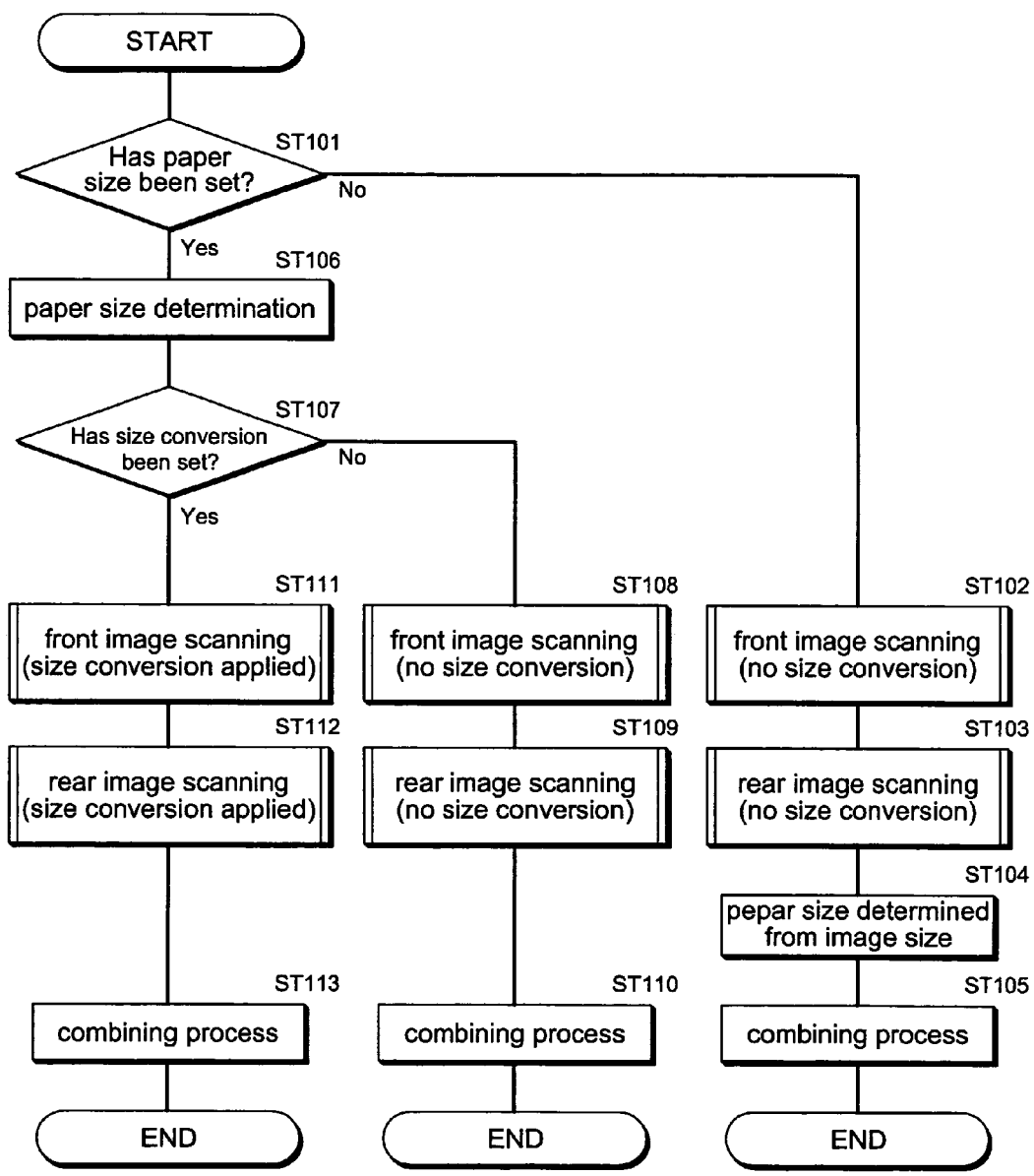
FIG. 9 is a flowchart describing the processing procedure of the image processing apparatus shown in FIG. 1.

FIG. 9 is a flowchart illustrating the control sequence executed by the image processing apparatus shown in FIG. 1. This example describes a "2 into 1" scanning procedure in which the images obtained from the front and back side scans of a single page document are arranged within the output image. At step 101, it is determined whether or not an output size (paper size) has been specified. When the paper size has not been specified, the sequence will proceed to step 102 where the front of the document is scanned, and then to step 103 where the rear of the document is scanned. The sequence then continues to step 104 where the paper size is determined from the image size, and to step 105 where the front and back images are combined into a single image.

Conversely, when it is determined at step 101 that the paper size has been specified, the sequence proceeds to stop 106 where the paper size is determined, and to step 107 where it is established whether the image size conversion process has been activated or not. If the image size conversion process has not been activated, the sequence proceeds to step 108 where the front side of the original document is scanned, and then to step 109 where the rear side of the original document is scanned. The sequence then proceeds to step 110 where the front and back images are combined into a single image.

Furthermore, when it is determined, at step 107, that the size conversion process will be executed, the sequence proceeds to step 111 where the front image of the document is scanned and the size conversion process is applied to the scanned image, and then to step 112 where the rear image on the document is scanned and the size conversion process is applied to the scanned image. The sequence then proceeds to step 113 where the front and back image combining process is executed.

Figure 10A:
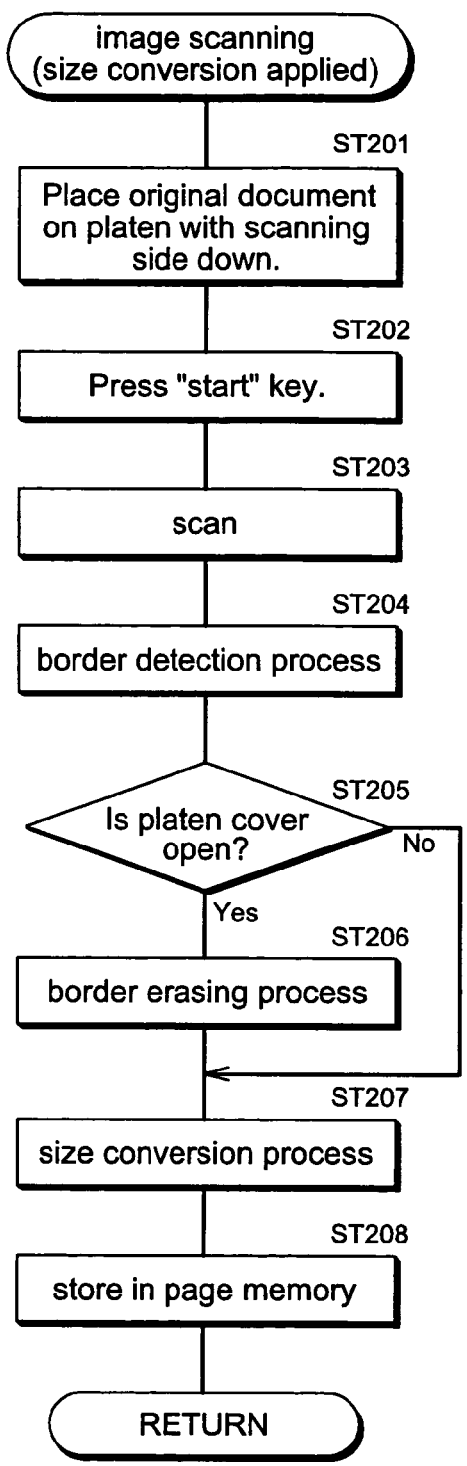
FIG. 10(A) is a flowchart describing the scanning procedure shown in FIG. 9.

FIGS. 10(A) and (B) are flowcharts illustrating the control sequences of the scanner noted in FIG. 9. FIG. 10(A) shows the scanner control sequence when the size conversion process, noted in steps 111 and 112 of FIG. 9, is executed. First, at step 201, the original document is placed front-side-down on the platen. The "Start" key is pressed at step 202. The original document image is then scanned by scanner 2 at step 203. Scanned image processor 3 detects the border area during the image scan at step 204. It is recognized whether or not the platen cover is open at step 205. When the platen cover is recognized to be open, the sequence proceeds to step 206 where the image border area erasing process is executed. After that, the sequence proceeds to step 207. When the platen cover is recognized to be close at step 205, the sequence also proceeds to step 207. At step 207, the image size conversion process is executed according to the image size conversion rate derived from the specified output size and number of images. The image is stored in page memory 4 at step 208. It is noted that the procedure from steps 204 through 208 is executed for each scan line.

Figure 10B:
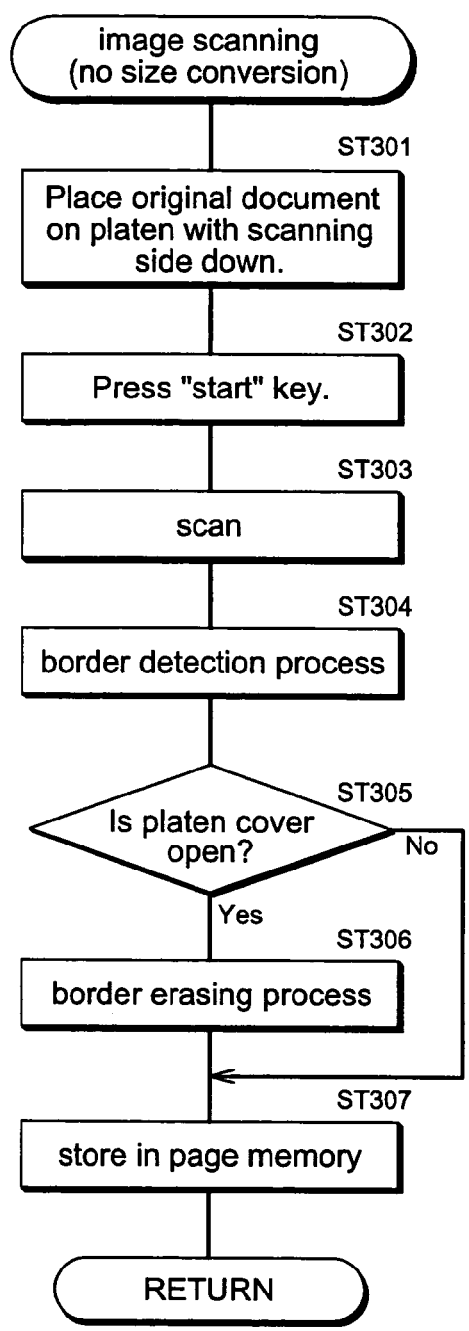
FIG. 10(B) is a flowchart describing the scanning procedure shown in FIG. 9.

FIG. 10(B) shows the operation of the scanner control sequence without applying the size conversion process noted in steps 102, 103, 108, and 100 in FIG. 9. The operations executed in steps 301 though 306 are identical to those of steps 201 through 206 in FIG. 10(A). In this sequence, however, the size conversion process executed at step 207 in FIG. 10(A) is not applied, and at step 307 the image is stored in page memory 4 after the border erasing process is performed in step 306, without applying the size conversion process to the scanned image.

Figure 11:
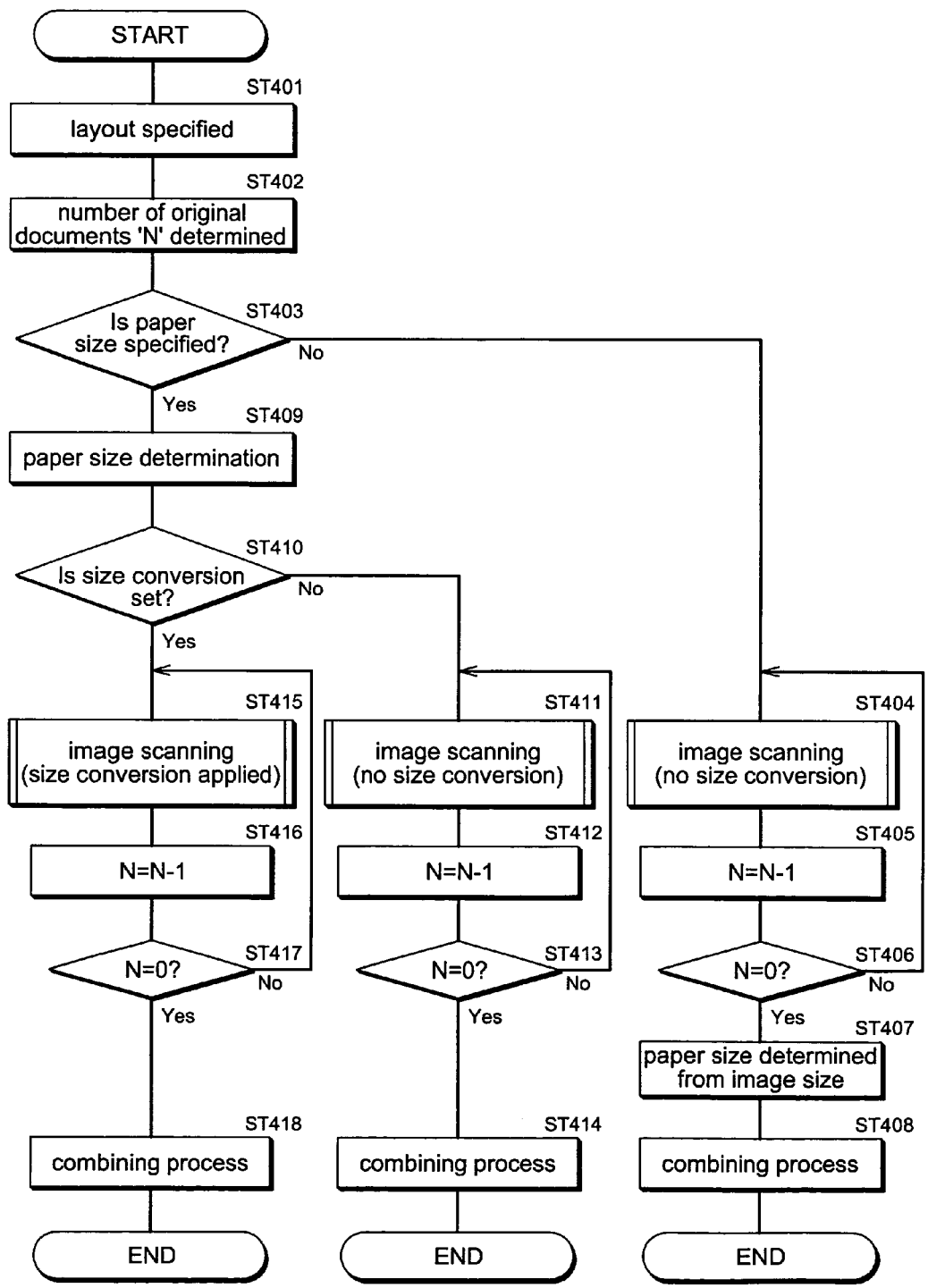
FIG. 11 is a flowchart describing the operational sequence of the image processing apparatus shown in FIG. 1.

FIG. 11 is a flowchart illustrating the control sequence of the image processing apparatus shown in FIG. 1. This flowchart describes the procedure used to produce an "N into 1" output image in which images obtained from multiple scanned original documents have been arranged within the output image. First, at step 401, the image layout is specified at control panel 8. After that, the number of original documents (number of images) N is determined at step 402. The image layout can be formatted, for example, as a 2×2 (N=4), 2×3 (N=6), 2×4 (N=8) or other like layout.

At step 403, it is determined whether or not the paper size (output size) has been specified. When the paper size has not been specified, the sequence proceeds to step 404 where the original document is scanned, to step 405 where the number of original documents 'N' is reduced by 1, to step 406 where an inquiry is made as to whether the number of original documents 'N' is zero (0), and back to step 404 to scan the next original document when all of the original documents have not yet been scanned. When it is determined at step 406 that all of the original documents have been scanned, the control sequence proceeds to step 407 where the paper size is determined based on image size and the number of original documents, and to step 408 where the image combining process is executed.

Conversely, when the paper size has been specified at step 403, the sequence proceeds to step 409 where the paper size is determined, to step 410 where it is determined if the size conversion process is to be applied. When the size conversion process is applied, the sequence proceeds to step 411 where the image is scanned and the size conversion process is not applied to the scanned image. At step 412, the number (N) of original documents is reduced, at step 413, it is determined that all of the original documents have been scanned, and at step 414, the image combining process is conducted.

Moreover, when it is determined, at step 410, that the size conversion process is to be applied, the sequence proceeds to step 415 where the scanning process is executed and the size conversion process is applied to the scanned image. At step 416, the number (N) of original documents is reduced, at step 417, it is determined if all of the original documents have been scanned, and at step 418, the image combining process is executed.

The image scan at step 415 is conducted together with the size conversion process shown in FIG. 10A, and the scan conducted at steps 404 and 411 is conducted without the size conversion process shown in FIG. 10B.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-426698 filed on Dec. 24, 2003, entire content of which is expressly incorporated by reference herein.

What is claimed is:

1. An image processing apparatus, having an image combining function in which a plurality of pages of image data is scanned, the plurality of pages of the scanned image data is combined into one page, and the combined image data is printed on a single sheet of recording paper, the image processing apparatus comprising:
    a scanner that scans the plurality of pages of the image data, at least one of the plurality of pages of the image data having a size different from a size of another page;
    a printer that prints image data on a sheet of the recording paper; and
    a controller that determines the image data having a largest size among the plurality of pages of the scanned image data, to determine a size of a sheet of the recording paper, based on the determined largest size, the determined size of the sheet of the recording paper based on a product of the determined largest size and a number of the plurality of pages of the scanned image data, to combine the plurality of pages of the scanned image data into one page, and to print the combined image data on the single sheet of the recording paper having the determined size.

2. The image processing apparatus according to claim 1, wherein the image data, having a size smaller than the largest size, is centered within a recording area where the image data having the smaller size is printed.

3. The image processing apparatus according to claim 1, wherein the scanner has a glass surface on which a document having image data to be scanned is positioned, the scanner has a platen cover that urges the document toward the glass surface, and the controller eliminates data outside the positioned document and within a scanning area of the scanner, when the document is positioned on the glass surface and the glass surface is not covered by the platen cover.

4. The image processing apparatus according to claim 3 further comprising a detector that detects whether the glass surface is covered by the platen cover, wherein the controller eliminates data outside the positioned document and within the scanning area of the scanner, when the cover is not detected by the detector.

5. An image processing method, having an image combining function in which a plurality of pages of image data is scanned, the plurality of pages of the scanned image data is combined into one page, and the combined image data is printed on a single sheet of recording paper, the image processing method comprising:
    scanning a plurality of pages of image data, at least one of the plurality of pages of the image data having a size different from a size of another page;
    determining the image data having a largest size among the plurality of pages of the scanned image data;
    determining a size of the recording paper, based on the determined largest size, the determined size of the recording paper based on a product of the determined largest size and a number of the plurality of pages of the scanned image data;
    combining the plurality of pages of the scanned image data into one page; and
    printing the combined image data on the single sheet of the recording paper having the determined size.

* * * * *